United States Patent
Berkowitz

(10) Patent No.: US 10,688,921 B2
(45) Date of Patent: Jun. 23, 2020

(54) VEHICULAR DOOR SAFETY WARNING SYSTEM

(71) Applicant: Mary R. Berkowitz, Meadowbrook, PA (US)

(72) Inventor: Mary R. Berkowitz, Meadowbrook, PA (US)

( * ) Notice: Subject to any disclaimer, the term of this patent is extended or adjusted under 35 U.S.C. 154(b) by 0 days.

(21) Appl. No.: 16/531,221

(22) Filed: Aug. 5, 2019

(65) Prior Publication Data

US 2020/0039429 A1     Feb. 6, 2020

Related U.S. Application Data

(60) Provisional application No. 62/714,143, filed on Aug. 3, 2018.

(51) Int. Cl.
| | |
|---|---|
| *B60Q 1/30* | (2006.01) |
| *B60Q 1/52* | (2006.01) |
| *B60Q 1/00* | (2006.01) |
| *B60R 16/033* | (2006.01) |
| *B60Q 1/26* | (2006.01) |
| *F21V 15/01* | (2006.01) |
| *F21V 23/02* | (2006.01) |
| *F21V 23/04* | (2006.01) |
| *F21V 31/00* | (2006.01) |
| *F21V 9/08* | (2018.01) |

(Continued)

(52) U.S. Cl.
CPC .......... *B60Q 1/525* (2013.01); *B60Q 1/0076* (2013.01); *B60Q 1/2615* (2013.01); *B60R 16/033* (2013.01); *F21V 9/08* (2013.01); *F21V 15/01* (2013.01); *F21V 23/02* (2013.01); *F21V 23/0407* (2013.01); *F21V 31/00* (2013.01); *F21W 2107/10* (2018.01); *F21Y 2115/10* (2016.08)

(58) Field of Classification Search
CPC .... B60Q 1/525; B60Q 1/0076; B60Q 1/2615; B60R 16/033; F21V 9/08; F21V 15/01; F21V 23/02; F21V 23/0407; F21V 31/00; F21Y 2115/10; F21W 2107/10
See application file for complete search history.

(56) References Cited

U.S. PATENT DOCUMENTS

| | | |
|---|---|---|
| 4,249,160 A | 2/1981 | Chilvers |
| 4,833,448 A | 5/1989 | Chang |
| 4,965,546 A | 10/1990 | Chang |

(Continued)

*Primary Examiner* — Munear T Akki
(74) *Attorney, Agent, or Firm* — Dunlap Bennett & Ludwig PLLC

(57) ABSTRACT

An after-market, low cost and easily installed vehicular door safety warning light system using electromechanical actuation for automatically providing a visual warning to passing traffic that a car door is opening and passengers are about to exit the vehicle. The safety warning light system includes a magnetically actuated switch to effectuate the light-emitting elements, wherein the light-emitting elements are automatically switched on only when the car door is opened and are highly visible throughout the entire opening arc of the door and do not shut off until the vehicle door is closed. The light-emitting elements are uniquely housed as a single device in a single housing or a plurality of jointed sections adapted to fit and adhere to the variable contours and inner surface areas of and along an open car door regardless of the vehicle's make or model.

4 Claims, 4 Drawing Sheets

(51) Int. Cl.
*F21W 107/10* (2018.01)
*F21Y 115/10* (2016.01)

(56) References Cited

U.S. PATENT DOCUMENTS

| | | | |
|---|---|---|---|
| 4,972,173 A * | 11/1990 | Raciti | B60Q 1/323 340/472 |
| 5,121,098 A | 6/1992 | Chen | |
| 5,828,299 A * | 10/1998 | Chen | B60Q 1/0076 340/468 |
| 5,969,603 A | 10/1999 | Wang | |
| 6,184,786 B1 * | 2/2001 | Medeiros | B60Q 1/2611 340/463 |
| 7,068,160 B2 | 6/2006 | Tourneur et al. | |
| 7,226,112 B2 | 6/2007 | Ward | |
| 7,416,320 B2 * | 8/2008 | Sakiyama | B60Q 1/323 362/501 |
| 7,674,026 B2 | 3/2010 | Uchida et al. | |
| 7,862,220 B2 | 1/2011 | Cannon et al. | |
| 8,007,147 B2 | 8/2011 | Lin | |
| 8,007,148 B2 | 8/2011 | Yamauchi et al. | |
| 8,408,766 B2 | 4/2013 | Wilson et al. | |
| 8,620,549 B2 | 12/2013 | Nickolaou et al. | |
| 9,573,517 B2 | 2/2017 | Salter et al. | |
| 10,059,261 B2 | 8/2018 | Wu | |
| 2005/0231337 A1 * | 10/2005 | Tourneur | B60Q 9/00 340/426.28 |
| 2009/0033474 A1 | 2/2009 | Chen | |
| 2011/0115376 A1 | 5/2011 | Shiratsuchi et al. | |
| 2011/0221589 A1 * | 9/2011 | LeBeau | B60Q 1/2669 340/468 |
| 2012/0065858 A1 | 3/2012 | Nickolaou et al. | |
| 2012/0194356 A1 | 8/2012 | Haines et al. | |
| 2015/0002288 A1 * | 1/2015 | Lee | B60Q 1/46 340/471 |
| 2015/0046027 A1 | 2/2015 | Sura et al. | |
| 2015/0138818 A1 * | 5/2015 | Salter | B60Q 3/30 362/510 |
| 2017/0236389 A1 | 8/2017 | Tang | |
| 2018/0022271 A1 * | 1/2018 | Huang | B60Q 1/30 340/471 |

\* cited by examiner

VEHICULAR DOOR SAFETY WARNING SYSTEM

CROSS-REFERENCE TO RELATED APPLICATION

This application claims the benefit of priority of U.S. provisional application No. 62/714,143, filed 3 Aug. 2018, the contents of which are herein incorporated by reference.

BACKGROUND OF THE INVENTION

The present invention relates to automotive warning safety systems and, more particularly, an electromechanical safety warning light device arranged on the inner metal fitting face of a vehicle door that flashes automatically like a hazard light when the car door is in an opening and/or opened position, thereby warning passing traffic of the danger of hitting the open door or the exiting occupants of the car.

When the occupants of cars open their doors on the side of passing traffic, their safety is at great risk during the day and most definitely at night. The present invention embodies a light-emitting safety system adapted to automatically draw attention to and highlight the opening and/or open door, thus warning passing cars and bicyclists (who also risk injury from impacting the car's open door) to take notice, slow down and maneuver accordingly to safely avoid the exiting car occupant and the open door itself.

This safety system will automatically activate warning lights as soon as the car door first opens, through the entire arc of the opening door, and will continue to illuminate the open car door until the car door is closed.

Currently, no similar safety warning device exists in the field. To date, car and truck manufacturers have not installed hazard lights warning of opening vehicle doors. Front and rear hazard lights warning approaching cars of a stopped or broken-down vehicle have become standard electrical equipment. However, there are no such factory-installed or low-cost, easy-to-install, after-market lights which warn an approaching vehicle of an opening or opened car door and an exiting occupant. Car manufacturers have been notoriously slow to develop additional safety features due to significantly increased manufacturing costs, although occupant safety has been a fast-growing area of interest for the public. This area of occupant safety—exiting as safely as possible from a car into passing traffic—has been completely ignored. Clearly, a real need exists in the field.

Statistics have shown that many people are killed or severely injured when exiting their cars on the side of passing traffic during the day and especially at night. There are also countless accidents involving bicyclists smashing into opening car doors especially in the dark. Hopefully many, if not most, of these accidents can be avoided entirely with the use of the present invention—a simple structure of flashing LED lights automatically powered by its own fully integrated replaceable battery and magnetic switch and independent of the power source of the vehicle—which warns approaching cars and bicyclists of an obstacle in their path. Most importantly, this safety warning device would impart a most significant and important level of needed protection for car drivers and their passengers as they exit their vehicle as well as for drivers and bicyclists passing nearby.

SUMMARY OF THE INVENTION

In an exemplary embodiment of the present invention, a vehicular door safety warning light system, a jointed waterproof lighting strip includes the following: a plurality of cubic housings connected and/or hinged along an upper portion of a flexible backing material, the underside of which is covered with an adhesive or magnetic material; the flexible backing material between adjacent cubic housings enables said adjacent cubic housings to bend toward and away from each other in order to conform to the variable and small contours of the inner metal fitting face of a vehicle door; a fully integrated replaceable battery or batteries as the power source; and, one or more lighting elements either disposed along an outer surface of one or more housings of the plurality of cubic housings or, as in this particular exemplary embodiment, LED bulbs are arranged and centered beneath four colored light lenses, which in this exemplary embodiment are two red and two yellow.

Wherein the exemplary embodiment, the vehicular door safety warning light system additionally includes the following: an electromechanical switch housed inside the center housing to which the one or more lighting elements are electrically coupled thereto; wherein the electromechanical switch comprises a magnet movable between an off condition and an on condition, wherein the magnet is adapted to be magnetically attracted to ferromagnetic material (the metal inner face of the vehicle door jamb) adjacent to an upper portion of the housing so as to move to the off condition, and wherein if said upper portion is moved from said ferromagnetic material (the vehicle door opens), the magnet automatically moves to the on condition thus activating the flashing light warning device.

In another exemplary embodiment of the present invention, a vehicular door safety warning light system includes the following: a single cubic housing having an upper element and an adhesive or magnetic backing; a fully integrated replaceable battery or batteries as the power source; an electromechanical switch housed inside the housing; one or more lighting elements disposed along the outer surface of the single housing and coupled to the electromechanical switch; wherein the electromechanical switch comprises a magnet movable between an off condition and an on condition, wherein the magnet is adapted to be magnetically attracted to ferromagnetic material (the metal inner face of the vehicle door jamb) adjacent to an upper portion of the housing so as to move to the off condition, and wherein if said upper portion is moved from said ferromagnetic material (the vehicle door opens), the magnet automatically moves to the on condition thus activating the flashing light warning device.

In yet another embodiment of the present invention, a vehicular door safety warning light system arranged on the inner metal fitting face of a vehicle door that flashes automatically like a hazard light when the vehicular door is in an opening and/or opened position, thereby warning passing traffic and those approaching from behind of the danger of hitting the open door or the exiting occupants so as to avoid serious injury, includes the following: a single or multiple light sources contained beneath a colored or transparent lens cover or covers and/or disposed along the surface of a single and/or a plurality of housings adhered to the inside of a vehicle door as a single warning light device; an adhered location on the inner metal fitting face of a vehicle door exposed when the door is opened; said single or multiple light source actuated by a battery or batteries, a magnet and an electromechanical switch housed inside at least one of the housings and electrically coupled to each light source; an automatic activation of the light source when a vehicle door is opened using an electromechanical switch and deactivated when the vehicle door is closed; a switch using a magnet to activate and deactivate the lighting element or elements due to the proximity of the ferrous material of the door jamb; an integrated power source (battery or batteries) independent of a vehicle's own electrical or computer system; a light source which blinks or flashes to attract the attention of passing traffic; an adhesive or magnetic material on the bottom surface of a backing material which adheres the housing and or housings to the inner metal fitting face of a vehicle door; and an electromechanical switch or switches having a magnet (or magnets) and a switch beam movable between an off condition and an on condition, wherein the magnet is configured to be magnetically attracted to ferromagnetic material (the metal inner face of the vehicle door jamb) adjacent to an upper portion of the housing associated with the electromechanical switch in the open or off condition, and wherein if said upper portion is moved from said ferromagnetic material (the vehicle door opens), the magnet mechanically connected to an attachment point of the switch beam urges the switch beam to the closed or on condition thus automatically activating the flashing lights of the safety warning light system.

The above-mentioned vehicular door safety warning light system may further include a plurality of waterproof housings are connected along an upper portion of a flexible backing material or hinged so that said adjacent housings may move toward and away from each other in order to conform to the variable and small contours of the inner metal fitting face of a vehicle door.

The above-mentioned vehicular door safety warning light system may further include that the lighting elements in the plurality of housings can all activated by at least one switch and power source.

The above-mentioned vehicular door safety warning light system may further embody a method of warning a passerby, passing traffic or a bicyclist of an opening or open vehicular door in order to avoid serious injury to the exiting occupants of the vehicle and to those approaching from behind, including the following: adhering a lower adhesive portion of said backing material along an inner door face of a vehicular door, so that when the vehicular door is closed an inner surface of an associated door jamb moves the magnet to the off condition, and when the vehicular door opens the magnet moves to the on condition thus automatically actuating the highly visible flashing lights through the entire opening arc of the door and does not shut off until the vehicular door is closed.

Further embodiments include vehicular door lighting system having the following: a flexible backing material; a plurality of housings spaced apart along an upper portion of the backing material so that the backing material between adjacent housings is enabled to bend said adjacent housings toward and away from each other along a longitudinal axis defined by the backing material; and a lighting element provided along an outer surface of one or more housing of the plurality of housings, wherein the backing material between adjacent housings is a living hinge, wherein one or more lighting element is disposed along a side portion of the housing associated thereto, and in further embodiments including one electromechanical switch housed inside at least one of the plurality of housings; and said electromechanical switch electrically coupled to each lighting elements, wherein the electromechanical switch comprising a magnet movable between an off condition and an on condition, wherein the magnetic is configured to be magnetically attracted to ferrous material adjacent to an upper portion of the housing associated with the electromechanical switch in the off condition, and wherein if said upper portion is moved from said ferrous material the magnet moves to the on condition, which may include a switch beam biasing to the magnet to the on condition, wherein the backing material provides adhesive material.

In a certain embodiment, a vehicular door lighting switch may include the following: a housing having an upper element; an electromechanical switch housed inside the housing; one or more lighting element coupled to the electromechanical switch; each light disposed along an outer portion of the upper element; the electromechanical switch having a switch beam movable between an open condition and a closed condition powering each lighting element; and a magnet mechanically connected to an attachment point of the switch beam, wherein the magnet urges the switch beam to the open condition when ferrous magnetic material is adjacent to the upper element, wherein the ferrous magnetic material is a portion of a door well or jamb of a vehicle, wherein the ferrous magnetic material is not a magnet, and including a power source in the housing.

The above-mentioned embodiments may be embodied in a method of warning a passerby of an open vehicular door including the following: providing the vehicular door lighting system; adhering a lower portion of said backing material along an inner door face of a vehicular door, so that when the vehicular door is closed an inner surface of an associated door well moves the magnet to the off condition, and when the vehicular door opens the magnet moves to the on condition.

In summary, this vehicular door safety warning system provides an important and innovative addition to a dangerously overlooked area of automobile and human safety by making the opening of a car door on the side of traffic immeasurably safer for the exiting occupants and for passing traffic.

These and other features, aspects and advantages of the present invention will become better understood with reference to the following drawings, description and claims.

DETAILED DESCRIPTION OF THE INVENTION

Figure 1A:
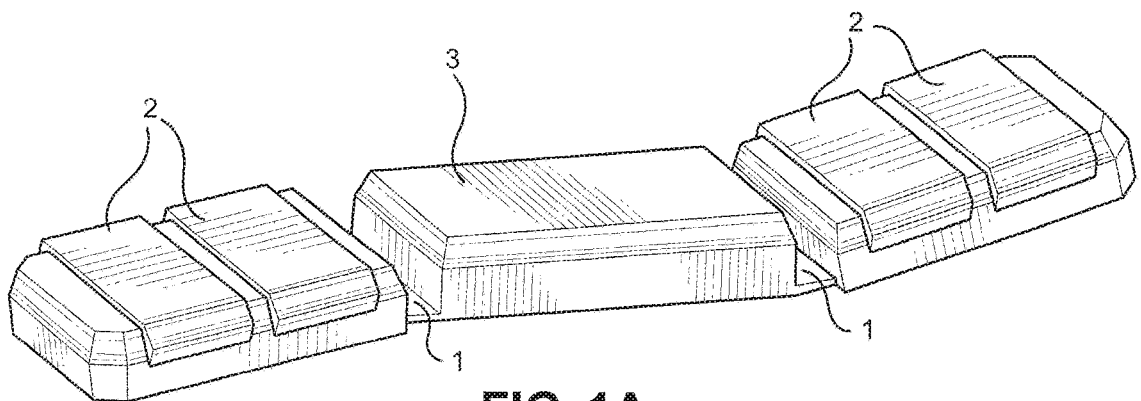
FIG. 1A is a perspective view of an exemplary embodiment of the present invention.

The following detailed description is of the best currently contemplated mode of carrying out an exemplary embodiment of the invention. The description is not to be taken in a limiting sense, but is made merely for the purpose of illustrating the general principles of the invention, since the scope of the invention is best defined by the appended claims.

Broadly, an embodiment of the present invention provides an electromechanical safety warning light system using electromechanical actuation for automatically providing visual output from, for example, flashing red or red/yellow highly visible LED lights to warn a passing driver or bicyclist of an obstacle in its path. The electromechanical safety warning light system includes circuitry actuated by way of a magnetic-based switch to effectuate the light-emitting portions. The safety light may embody a unique structure, jointed in a plurality of waterproof sections and thus configured in size and flexibility to fit and adhere to the inner metal fitting face surface areas of and along an open car door. The fully integrated power source and the jointed structure allow the safety light embodied by the present invention to be placed anywhere on that inner metal surface, thus enabling applicability to different car manufacturers and models. In one embodiment, the present invention automatically turns on bright red and/or red/yellow blinking warning LED lights at the moment the car door opens, which are highly visible throughout the entire opening arc of the door, and do not shut off until the car door closes. As a result, there is no need for the exiting driver or passengers to remember to manually trigger switches or settings. Of course, they must be aware of passing traffic near to them, but they have the added protection of advanced cautionary notice to all those who are passing by. Further, this device can be placed on all car doors, thus providing this important protection on both sides of any car and on all four doors. Moreover, the present invention does not need a corresponding magnet to be separately attached and aligned along the opposing door well or jamb to work, thus significantly enhancing the ease of installation of the present invention. The power source of the safety warning light system is a replaceable battery or batteries and thus requires no connection to nor causes interference with the internal electrical or computer system of the vehicle.

In addition, the fully integrated power source for the magnetic circuitry is a replaceable battery or batteries, not connected to the electrical system of the car, thus making the installment of this safety device extremely fast, easy and low cost and, perhaps most importantly, unable to interfere with the internal electrical or computer system of the vehicle. Furthermore, even if the battery of the vehicle is dead, the present invention will continue to provide light and thus protection.

Referring now to FIGS. 1A through 4, the present invention may include a length, width and depth of approximately two to ten inches long, by one-half to two inches wide, by one-quarter to three-quarter inches deep in order to be universally adaptable to fit in the inner metal car door site or fitting face of most car doors on the market today. However, the dimensions may be otherwise dimensioned and adapted and are not to be considered limiting. In one exemplary embodiment, the present invention may provide a plurality of jointed, waterproof sections. The safety light device may be molded from a plasticized material which rests on flexible backing material 1 allowing it to mold and adhere to the variable and small contours of the inner metal fitting face of the car door. In this exemplary embodiment, the light output 2 is designed to emit bright, flashing LED lights widely through the front and beveled sides of the red and yellow colored lenses so that the lights may be visible throughout the entire arc of the opening door and remain on until the car door is closed. The red and yellow lenses (light output 2) may be fitted into their plastic housings covering LED output devices (seen in FIG. 1B as 5). The middle section of the warning light device, the housing 3, houses the magnetic-based switch, replaceable batteries and some of the circuitry. The flexible backing material 1 between the output 2 and housing portions 3 may act as living hinges or joints, providing flexibility and the capability for the entire length to bend at several portions enabling the present invention to conform and fit into variable contoured and small areas. The backing material 1 may be covered with an adhesive backing material 4 which will be designed to strongly adhere to the metal surface of the inner door sites, be removable without damaging the painted surface of the inner car door sites and be able to withstand a soaking rain. In certain embodiments, the adhesive backing material 4 may be magnetic material adapted to removably adhere to the ferromagnetic surface.

Figure 1B:
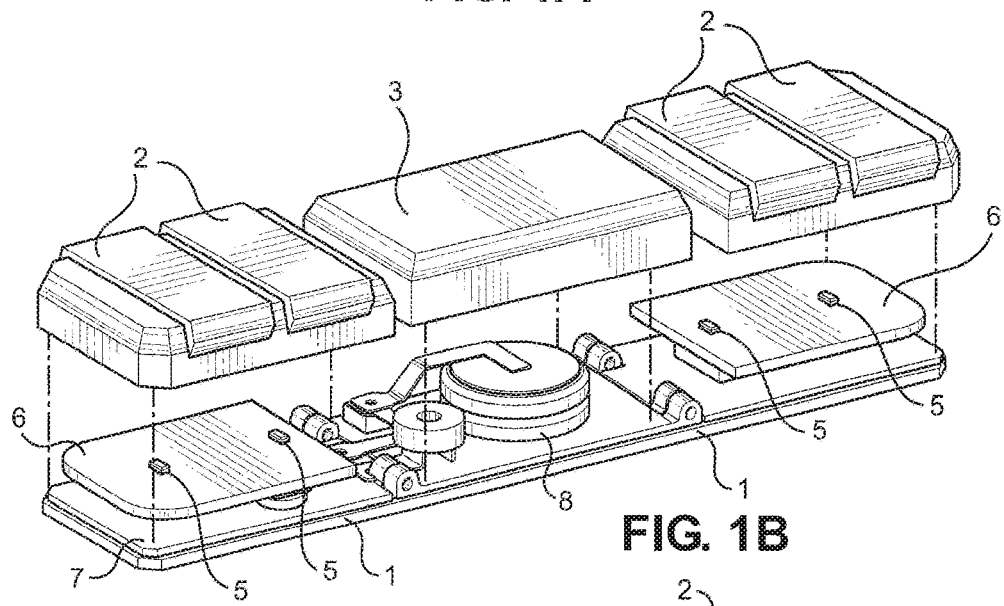
FIG. 1B is an exploded view of an exemplary embodiment of the present invention.
Figure 1C:
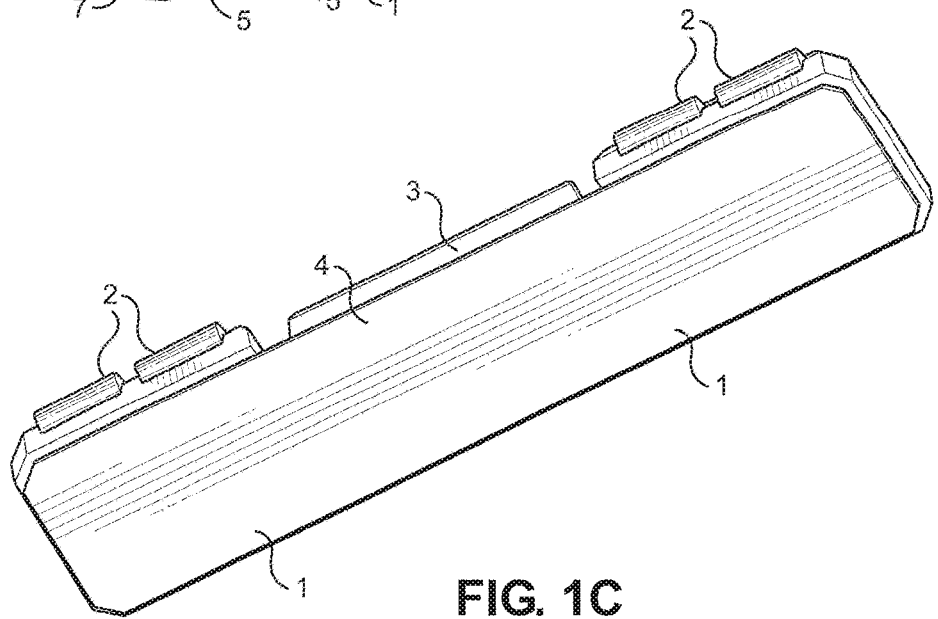
FIG. 1C is a bottom perspective view of an exemplary embodiment of the present invention.

FIG. 1B depicts an exploded view of a fully-assembled example of an embodiment of the jointed safety warning light device. In this exploded view, the LED lamps or bulbs 5 are centered under each of the four light lenses which in this preferred embodiment example are two red and two yellow. The LED platforms 6 which house the LED bulbs 5 is the other side of the circuitry board 7 which controls the power of the light source, speed of blinking intervals and sequential order of blinking colors. In addition, the configurations of these variables are designed to be highly visible to passing traffic without being distracting, interfering or uncomfortably bright. All configurations of these variables are within the scope and spirit of the present invention, are contemplated thereby, and are intended to be covered by the claims herein. The magnetic switch and battery assembly 8, in an exemplary embodiment is contained within the center housing 3 and is depicted and described in detail in FIGS. 2A, 2B, and 4.

Figure 2A:
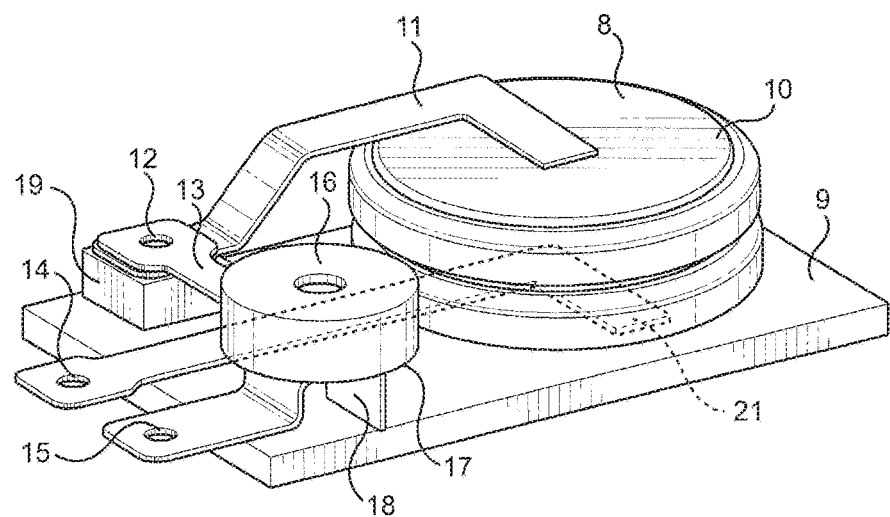
FIG. 2A is a perspective view of an exemplary embodiment of the present invention housed within 3 of FIGS. 1A and 1B.
Figure 2B:
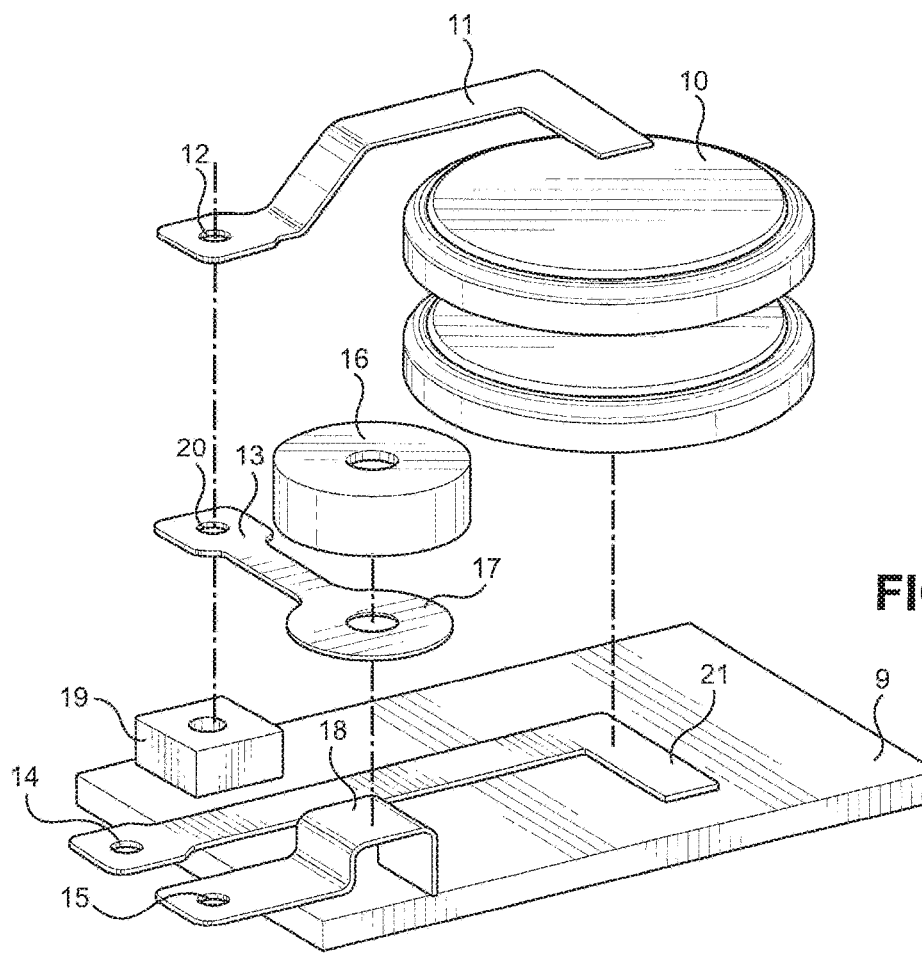
FIG. 2B is an exploded perspective view of an exemplary embodiment of the present invention housed within 3 of FIGS. 1A and 1B.
Figure 4:
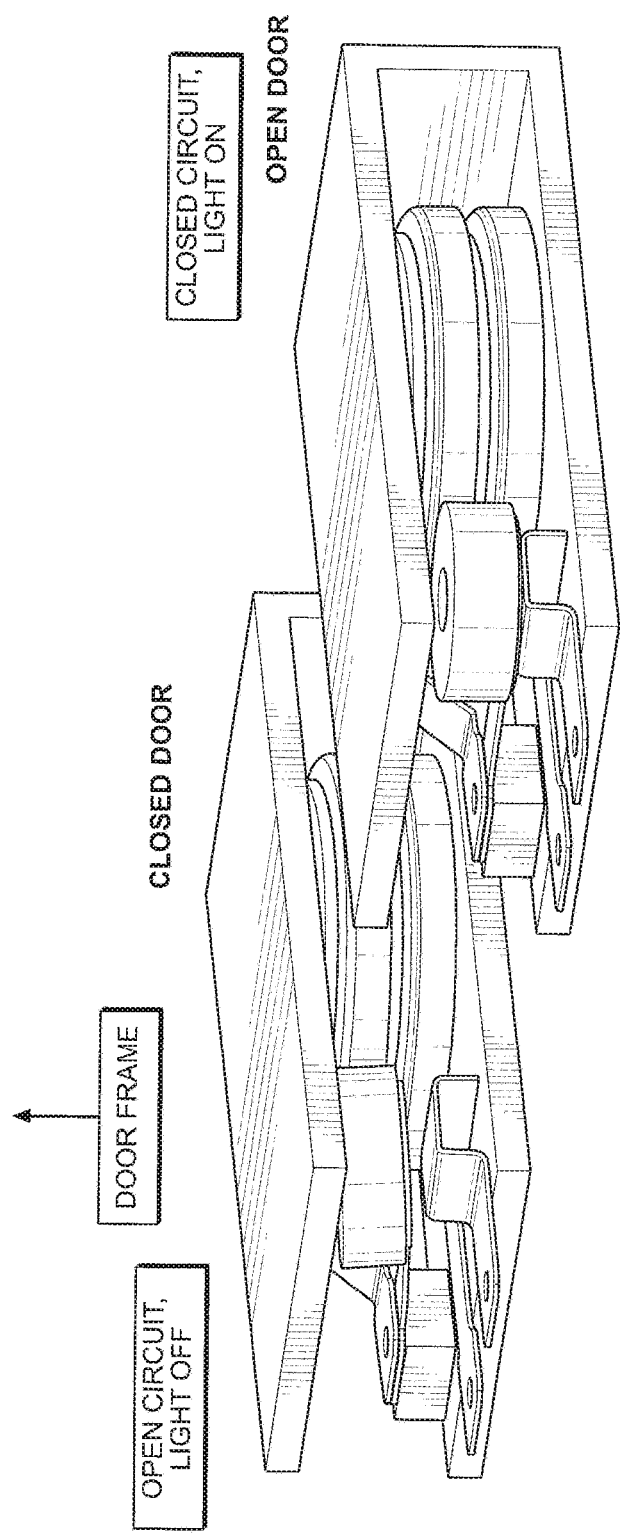
FIG. 4 is a perspective view of an exemplary embodiment of the present invention, illustrating the electromechanical circuitry when the car door is opened and closed.

FIG. 2A depicts the assembled magnetic switch and battery assembly 8 and the exploded view in FIG. 2B contained within the center housing 3. The power source 10, may be a battery or batteries, and may rest on the base plate 9. The circuit bracket 11 which may be copper or can be made of any other conductive material, runs from the battery 10, which it holds in place, to the switch beam 13. The connection point 12 on the end of the circuit bracket 11 connects the electrical circuitry and the switch beam 13. The contact point 14 connects the power circuit to the LED bulbs 5. The contact point 15 may be from the switched power circuit. The magnet 16 is fastened to the switch beam 13 at the attachment point 17 which rests on contact point 18. The switch beam's pivot point 20 rests on the pivot point base 19. Conductive piece 21 may be from the non-switched circuit. As depicted in FIG. 4, when the car door is closed, the magnet 16 is drawn up, attracted to the ferrous or ferromagnetic material of the inner metal face of the car door jamb. The circuit is open and the warning LED lights are off. The housing 3 in FIG. 1 prevents the magnet from over-extending. As soon as the car door opens and the magnetic switch and battery assembly 8 is not near the ferrous material of the inner metal face of the car door jamb, the magnet 16 attached to the biased springy switch beam 13 drops onto its contact point 18, closing the circuit and turning on the flashing red/yellow LED Bulbs 5, as illustrated in FIG. 4.

The internal magnetically activated switch of this systemic device allows the instant safety system to be easily and quickly retro-fitted to pre-existing vehicles at low cost as opposed to expecting a consumer wanting this safety feature to have to pay for the systemic devices to be electrically coupled at considerable cost to the electrical system and/or computer system of the vehicle they wish to modify. This safety device is, therefore, one-piece, low-cost, and easily placed on the inner metal surface face of all car doors requiring, most importantly, no alignment of a separate systemic component, for example an external magnet, that must be attached, glued or riveted and align perfectly on the adjacent door jamb or well.

Figure 3:
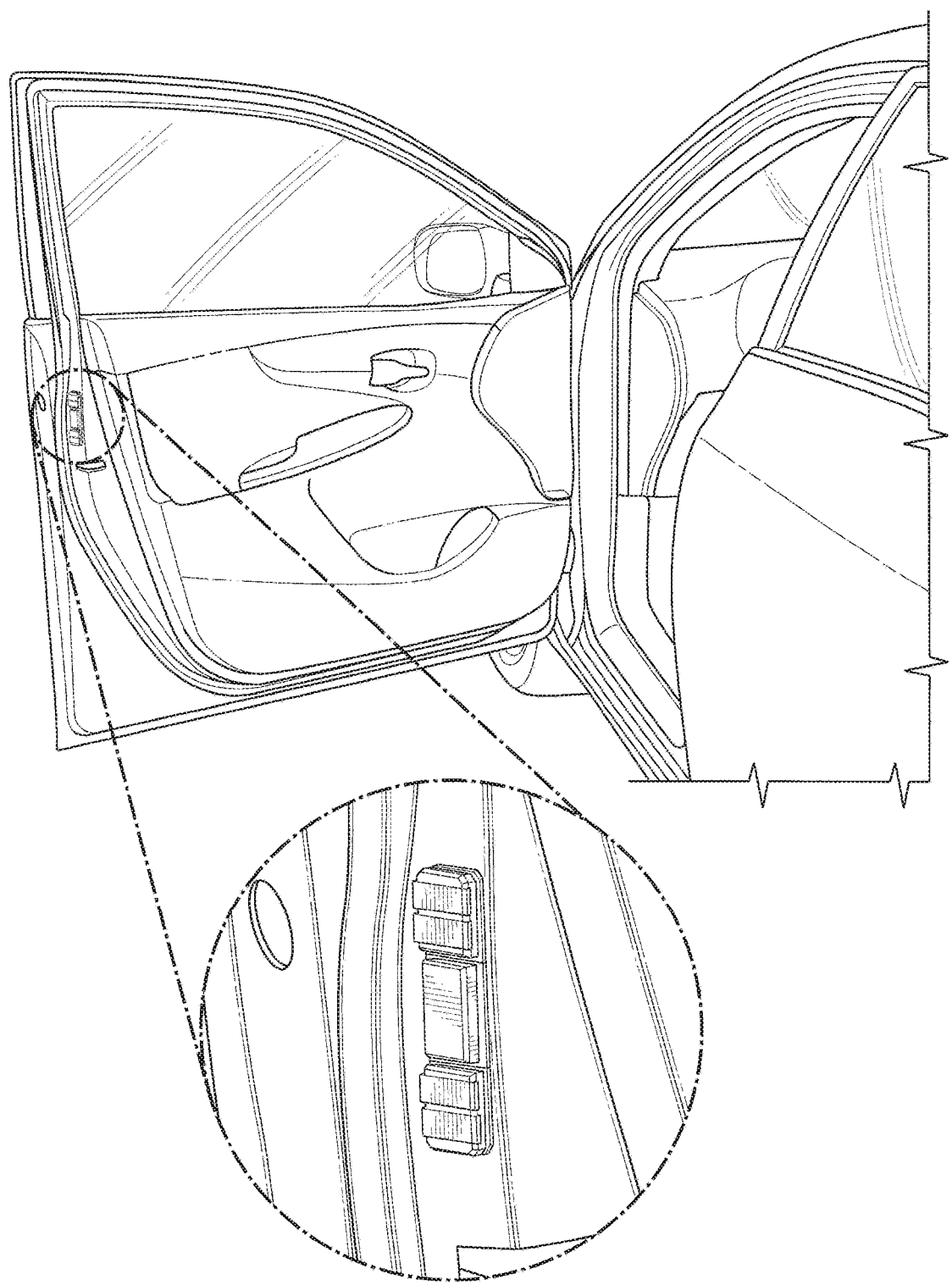
FIG. 3 is a perspective view and a detailed view of an exemplary embodiment of the present invention, illustrating one of many placements thereof.

FIG. 3 depicts an exemplary placement of the present invention on the inner metal door face of the open car door, illustrating one of many placements thereof. FIG. 3 is a close up of the exemplary placement of the jointed safety light device. The exact placement is expected to be somewhat variable depending on the make, model and configuration of the specific automobile. The device can be installed on all four doors if so desired. Other size configurations that adapt to the sliding doors of Minivans are contemplated within the scope and spirit of the present invention.

It should be understood, of course, that the foregoing relates to exemplary embodiments of the invention and that modifications may be made without departing from the spirit and scope of the present invention as set forth in the following claims. Such modifications are not limited to, but may include among other things, changes to the circuitry, lighting elements and their location, color of the lens covers, size of and materials used for the jointed device or a singular non-jointed embodiment, selection of adhesives, magnets, batteries, and, as such, may be made without departing from the spirit and scope of the present invention.

What is claimed is:

1. A vehicular door safety warning light system arranged on the inner metal fitting face of a vehicle door that automatically flashes a hazard light when the vehicular door is in an opening and/or opened position, thereby warning passing traffic and those approaching from behind of the danger of hitting the open door or the exiting occupants so as to avoid serious injury, comprising: a single or multiple light sources contained beneath a colored or transparent lens cover or covers and/or disposed along the surface of a single and/or a plurality of housings adhered to inside of a vehicle door as a single warning light device; an adhered location on the inner metal fitting face of the vehicle door exposed when the door is opened; said single or multiple light source actuated by a battery or batteries, a magnet and an electromechanical switch housed inside at least one of the housings and electrically coupled to each light source; an automatic activation of the light source when a vehicle door is opened using an electromechanical switch and deactivated when the vehicle door is closed; a switch using a magnet to activate and deactivate the lighting element or elements due to a proximity of a ferrous material of a door jamb; an integrated power source includes battery or batteries independent of a vehicle's own electrical or computer system; a light source which blinks or flashes to attract the attention of passing traffic; an adhesive or magnetic material on a bottom surface of a backing material which adheres the housing and or housings to the inner metal fitting face of a vehicle door; and the electromechanical switch or switches having a magnet or magnets and a switch beam movable between an off condition and an on condition, wherein the magnet is configured to be magnetically attracted to ferromagnetic material includes the metal inner face of the vehicle door jamb adjacent to an upper portion of the housing associated with the electromechanical switch in the open or off condition, and wherein if said upper portion is moved from said ferromagnetic material when the vehicle door opens, the magnet mechanically connected to an attachment point of the switch beam urges the switch beam to the closed or on condition thus automatically activating the flashing lights of the safety warning light system.

2. The vehicular door safety warning light system of claim 1, wherein a plurality of waterproof housings are connected along an upper portion of a flexible backing material or hinged so that said adjacent housings may move toward and away from each other in order to conform to the variable and small contours of the inner metal fitting face of a vehicle door.

3. The vehicular door safety warning light system of claim 1, wherein the lighting elements in the plurality of housings can all activated by at least one switch and power source.

4. A method of warning a passerby, passing traffic or a bicyclist of an opening or open vehicular door in order to avoid serious injury to the exiting occupants of the vehicle and to those approaching from behind, comprising:

the vehicular door safety warning light system of claim 1; and adhering a lower adhesive portion of said backing material along an inner door face of a vehicular door, so that when the vehicular door is closed an inner surface of an associated door jamb moves the magnet to the off condition, and when the vehicular door opens the magnet moves to the on condition thus automatically actuating the highly visible flashing lights through the entire opening arc of the door and does not shut off until the vehicular door is closed.

\* \* \* \* \*